United States Patent
Lee et al.

(10) Patent No.: US 9,639,224 B2
(45) Date of Patent: May 2, 2017

(54) TOUCH PANEL WITH FINGERPRINT IDENTIFICATION

(71) Applicant: TPK Touch Solutions (Xiamen) Inc., Xiamen (CN)

(72) Inventors: Yuh-Wen Lee, Hsinchu (TW); Jiangping Chen, Xiamen (CN); Hao Chen, Wuhan (CN); Yu Zhang, Xiamen (CN); Hsiang-Lung Hsia, Changhua (TW); Quanfen Dai, Longyan (CN); Dongmei Ye, Xiamen (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 43 days.

(21) Appl. No.: 14/735,145

(22) Filed: Jun. 10, 2015

(65) Prior Publication Data

US 2015/0363629 A1    Dec. 17, 2015

(30) Foreign Application Priority Data

Jun. 13, 2014  (CN) .......................... 2014 1 0264717
Jul. 15, 2014  (CN) .......................... 2014 1 0336151

(51) Int. Cl.
*G06F 3/044*   (2006.01)
*G06K 9/00*    (2006.01)

(52) U.S. Cl.
CPC .......... *G06F 3/044* (2013.01); *G06K 9/0002* (2013.01); *G06K 9/00053* (2013.01)

(58) Field of Classification Search
CPC ................ G06F 3/041–3/044; G06F 9/0002
See application file for complete search history.

(56) References Cited

U.S. PATENT DOCUMENTS

| | | | |
|---|---|---|---|
| 6,459,460 B1 * | 10/2002 | Yamanaka | G02F 1/133308 349/58 |
| 7,929,736 B2 * | 4/2011 | Bechtel | G06F 3/03545 340/5.53 |
| 8,500,292 B2 * | 8/2013 | Lo | G02F 1/133308 362/627 |
| 8,760,559 B2 * | 6/2014 | Liu | H01L 27/14618 348/340 |
| 9,268,989 B2 * | 2/2016 | Pope | G06F 3/044 |
| 9,298,317 B2 * | 3/2016 | Chou | G06K 9/00026 |
| 9,322,862 B2 * | 4/2016 | Chou | G06F 3/044 |
| 9,383,845 B2 * | 7/2016 | Yoshiyama | G06F 3/044 |
| 2007/0115268 A1 * | 5/2007 | Jang | G02F 1/133308 345/183 |
| 2007/0115269 A1 * | 5/2007 | Jang | G02F 1/133308 345/183 |
| 2008/0138589 A1 * | 6/2008 | Wakabayashi | H01H 13/83 428/195.1 |
| 2010/0220900 A1 * | 9/2010 | Orsley | G06F 3/0421 382/124 |
| 2011/0102370 A1 * | 5/2011 | Kono | G06F 3/044 345/174 |
| 2011/0235364 A1 * | 9/2011 | Lo | G02F 1/133308 362/611 |

(Continued)

*Primary Examiner* — Patrick F Marinelli
(74) *Attorney, Agent, or Firm* — Cooper Legal Group, LLC

(57) ABSTRACT

A touch panel with fingerprint identification includes a fingerprint identification module disposed in a through hole of a first substrate. The fingerprint identification module and the first substrate are attached to a second substrate.

20 Claims, 7 Drawing Sheets

(56) References Cited

U.S. PATENT DOCUMENTS

| | | | |
|---|---|---|---|
| 2012/0118628 A1* | 5/2012 | Pakula | G06F 1/1626 174/520 |
| 2012/0154296 A1* | 6/2012 | Hinckley | G06F 3/0416 345/173 |
| 2012/0169639 A1* | 7/2012 | Tu | G02B 5/208 345/173 |
| 2012/0229686 A1* | 9/2012 | Imamura | G06F 1/1616 348/333.01 |
| 2012/0247937 A1* | 10/2012 | Saito | G06F 3/041 200/512 |
| 2012/0314126 A1* | 12/2012 | Liu | H01L 27/14618 348/374 |
| 2013/0093697 A1* | 4/2013 | Sun | G06F 3/044 345/173 |
| 2013/0100039 A1* | 4/2013 | Hong | B32B 37/1207 345/173 |
| 2013/0277196 A1* | 10/2013 | Mi | G06F 3/044 200/600 |
| 2013/0307818 A1* | 11/2013 | Pope | G06F 3/044 345/174 |
| 2014/0087197 A1* | 3/2014 | Weber | G02B 1/105 428/432 |
| 2014/0103941 A1* | 4/2014 | Chou | G06F 3/044 324/658 |
| 2014/0114007 A1* | 4/2014 | Nogami | B24B 37/00 524/487 |
| 2014/0140588 A1* | 5/2014 | Chou | G06K 9/0002 382/124 |
| 2014/0168121 A1* | 6/2014 | Chou | G06K 9/00013 345/173 |
| 2014/0168167 A1* | 6/2014 | Chou | G06K 9/00026 345/175 |
| 2014/0216914 A1* | 8/2014 | Pope | G06F 3/044 200/600 |
| 2014/0218330 A1* | 8/2014 | Ady | H03K 17/962 345/174 |
| 2014/0233161 A1* | 8/2014 | Liu | C03C 15/00 361/679.01 |
| 2015/0000837 A1* | 1/2015 | Kim | A61B 5/1172 156/275.5 |
| 2015/0022495 A1* | 1/2015 | Bussat | G06F 3/044 345/174 |
| 2015/0064432 A1* | 3/2015 | Matsuyuki | G02B 1/115 428/216 |
| 2015/0135108 A1* | 5/2015 | Pope | G06K 9/00006 715/767 |
| 2015/0153864 A1* | 6/2015 | Yoshiyama | G06F 3/044 345/173 |
| 2015/0185954 A1* | 7/2015 | Chang | G06F 3/0416 345/173 |
| 2015/0220183 A1* | 8/2015 | Youngs | G06F 3/044 345/173 |
| 2015/0233989 A1* | 8/2015 | Chou | G01R 27/2605 345/174 |
| 2015/0234494 A1* | 8/2015 | Cao | G06F 3/044 345/174 |
| 2015/0363629 A1* | 12/2015 | Lee | G06F 3/041 345/173 |
| 2015/0371076 A1* | 12/2015 | Lee | G06F 3/041 382/124 |
| 2016/0004896 A1* | 1/2016 | Pope | G06F 3/044 382/124 |
| 2016/0070414 A1* | 3/2016 | Shukla | G06F 3/0418 345/178 |
| 2016/0077622 A1* | 3/2016 | Lee | G06F 1/1626 345/173 |
| 2016/0109974 A1* | 4/2016 | Lee | B32B 9/04 345/173 |
| 2016/0171271 A1* | 6/2016 | Lundahl | G06K 9/0002 382/124 |
| 2016/0212872 A1* | 7/2016 | Pakula | G06F 1/1626 |
| 2016/0216813 A1* | 7/2016 | Setlak | G06K 9/00033 |
| 2016/0216823 A1* | 7/2016 | Setlak | G06F 3/0416 |
| 2016/0217311 A1* | 7/2016 | Bhagavat | H01L 27/14634 |
| 2016/0224142 A1* | 8/2016 | Yang | G06K 9/00006 |
| 2016/0224178 A1* | 8/2016 | Yang | G06K 9/00013 |
| 2016/0357294 A1* | 12/2016 | Ozeki | G06F 3/0412 |

* cited by examiner

TOUCH PANEL WITH FINGERPRINT IDENTIFICATION

BACKGROUND OF THE INVENTION

This application claims priority to Chinese Application Serial Number 201410264717.7, filed on Jun. 13, 2014 and 201410336151.4, filed on July 15, which are herein incorporated by reference.

TECHNICAL FIELD OF THE INVENTION

The present disclosure relates to a touch panel, and in particular to a touch panel with fingerprint identification.

RELATED ART OF THE INVENTION

Fingerprint identification techniques are gaining greater application to various electronic devices as an added security measure. Recently, the fingerprint identification technique is applied to smartphones to provide excellent theft prevention and privacy protection for personal mobile content, and has attracted public attention and become a main development point for future similar electronic devices.

For smartphones using current techniques, the fingerprint identifier is disposed corresponding to an activity key of the smartphone, i.e. the home button. The activity key is usually disposed in a specific through hole of the mobile device cover plate, but there is a chink between it and the mobile cover plate.

SUMMARY OF THE DISCLOSURE

The disclosure provides a touch panel with fingerprint identification including a fingerprint identification module disposed in a through hole of a first substrate. The fingerprint identification module and the first substrate are attached to a second substrate.

In one or more embodiments, a first adhesive layer is disposed between the first substrate and the second substrate to attach the first substrate to the second substrate.

In some embodiments, a second adhesive layer is disposed between the fingerprint identification module and the second substrate to attach the fingerprint identification module to the second substrate.

In some embodiments, the fingerprint identification module is fixed in the through hole of the first substrate by goo.

In some embodiments, a touch sensing structure is disposed on the farther surface of the first substrate to the second substrate.

In some embodiments, a touch sensing structure is disposed on the closer surface of the first substrate to the second substrate.

In some embodiments, a touch sensing structure is disposed on the closer surface of the second substrate to the first substrate.

In some embodiments, a covering layer is disposed on the surface of the second substrate between the first substrate and the second substrate, wherein the orthogonal projection of the covering layer onto the second substrate at least covers the orthogonal projection of the fingerprint identification module onto the second substrate.

In some embodiments, the second substrate has a concave portion, and the normal projections of the concave portion and the fingerprint identification module onto the second substrate overlap each other.

In some embodiments, a shielding structure is disposed between the first substrate and the second substrate, and surrounds the fingerprint identification module.

In some embodiments, a shielding structure is disposed between the second substrate and the covering layer, and surrounds the fingerprint identification module.

In some embodiments, a shielding structure surrounds the fingerprint identification module, wherein the covering layer is disposed between the second substrate and the shielding structure.

In some embodiments, the second substrate is formed of sapphire glass.

For the touch panel with fingerprint identification is formed by disposing the fingerprint identification module in the through hole of the first substrate and then attaching it to the second substrate, it is not necessary to punch a hole on the second substrate which is used for protecting product (i.e. the cover plate of the product). Therefore, the integrity of the second substrate is ensured, the strength of the substrate is kept, and the performance of the product is also ensured.

BRIEF DESCRIPTION OF THE DRAWINGS

The present disclosure will become more fully understood from the subsequent detailed description and accompanying drawings, which are given by way of illustration only, and thus are not limitative of the present disclosure, and wherein.

DETAILED DESCRIPTION OF THE DISCLOSURE

Figure 1:
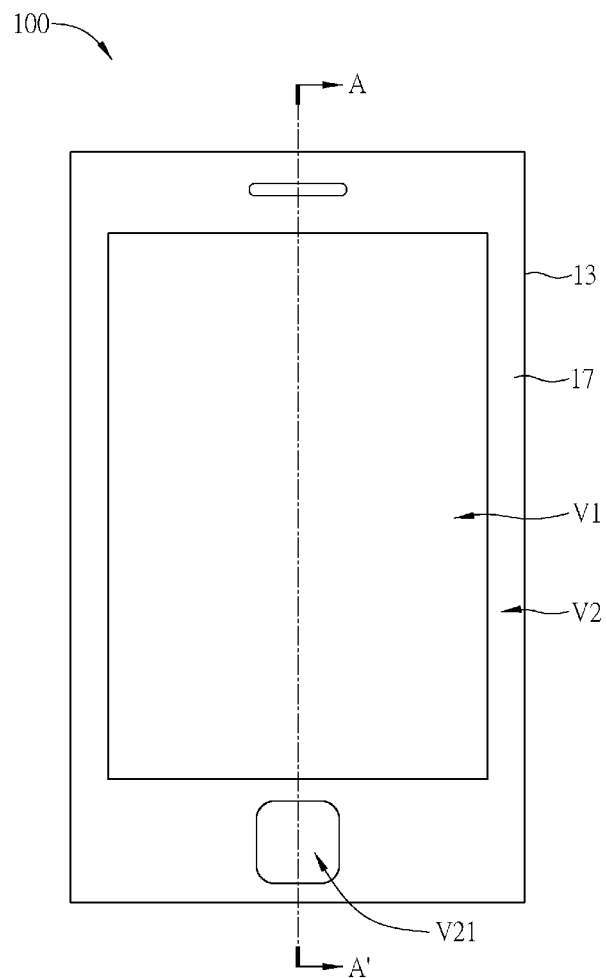
FIG. 1 is a front schematic diagram showing the touch panel with fingerprint identification according to one or more embodiments of the disclosure.

The present disclosure will be apparent from the following detailed description, which proceeds with reference to the accompanying drawings, wherein like reference numerals refer to like elements.

In the following embodiments, the terms "on," "above," "over," "upper," "under," "underneath," "below" and "lower" are used to describe the relative positions, and the recited elements may be directly contacted or indirectly contacted by inserting additional elements therebetween.

Figure 2:
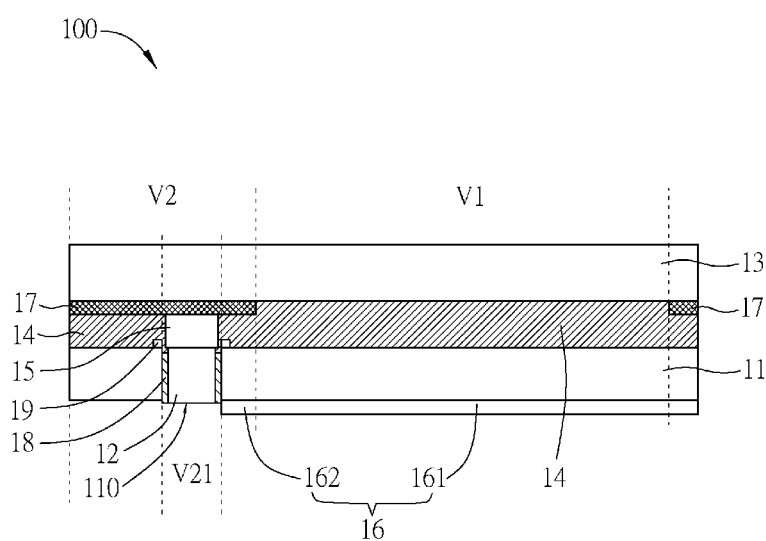
FIG. 2 is a sectional-drawing along cross-section line AA' in FIG. 1.

Referring to FIG. 1 and FIG. 2, FIG. 1 is a front schematic diagram showing a touch panel 100 with fingerprint identification according to at least one embodiment of the disclosure. FIG. 2 is a sectional-drawing along cross-section line AA' in FIG. 1, and it shows the touch panel 100 with fingerprint identification according to one or more embodiments of the disclosure. In some embodiments, a touch panel 100 with fingerprint identification includes: a first substrate 11 having a through hole 110; a second substrate 13 above and opposite the first substrate 11; and a fingerprint identification module 12 disposed in a through hole 110 of the first substrate 11. The first substrate 11 and the fingerprint identification module 12 are attached to the second substrate 13 by a first adhesive layer 14 and a second adhesive layer 15. A touch sensing structure 16 is disposed on the lower surface of the first substrate 11.

The second substrate 13 is formed of toughened glass or hard plastic, and it acts as a protecting cover plate of the touch panel 100 with fingerprint identification. The upper surface of the second substrate 13 is directly operated by touch by a user. Preferably, the second substrate 13 is formed of sapphire glass. Due to its characteristics of, among others, high hardness and excellent scratch resistance, sapphire glass provides better protecting ability and further improves quality of touch panel 100. To ensure fingerprint identification is accurately performed by the fingerprint identification module 12, the thickness of the second substrate 13 is preferably lower than or equal to about 0.3 mm. A covering layer 17 is disposed on the lower surface of the second substrate 13, and the covering layer 17 is between the second substrate 13 and the first adhesive layer 14. The orthogonal projection of the covering layer 17 onto the second substrate 13 covers the orthogonal projection of the fingerprint identification module 12 onto the second substrate 13. The covering layer 17 is formed of opaque printed ink or photoresist material, and it can hide several opaque elements, such as the fingerprint identification module 12 below the second substrate 13, from view. The covering layer 17 is a single-layer structure, or a multiple-layer structure formed by stacking layers of material. However, the disclosure is not limited thereto. In some embodiments, within the touch panel 100 with fingerprint identification, the area the covering layer 17 is located in defines an invisible area V2, and the area other than the invisible area V2 is visible area V1. The invisible area V2 includes a fingerprint identifying area V21. The fingerprint identification module 12 is disposed in the invisible area V2, and the area in which the fingerprint identification module 12 is located defines the fingerprint identifying area V21.

Figure 3A:
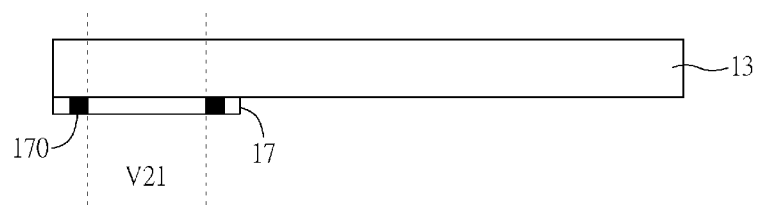
FIG. 3A is a schematic diagram showing the pattern structure of the touch panel with fingerprint identification according to some embodiments of the disclosure.

Referring to FIG. 3A, FIG. 3A is a schematic diagram showing a pattern structure of the touch panel 100 with fingerprint identification according to some embodiments of the disclosure. In some embodiments, in order to distinguish the fingerprint identifying area V21 and the invisible area V2 (shown in FIG. 2) from other parts and be beneficial for the user to perform operations accurately and easily on the fingerprint identifying area V21, the covering layer 17 is partially hollowed out, and the hollowed space is filled with shading material having different color from the covering layer 17 to form a pattern structure 170 for indicating the fingerprint identifying area V21. In some embodiments, as shown in FIG. 3A, the pattern structure 170 can surround the fingerprint identifying area V21. In other embodiments, the pattern structure 170 has another pattern or shape, and identification manner of the pattern structure 170 is not specifically limited.

Figure 3B:
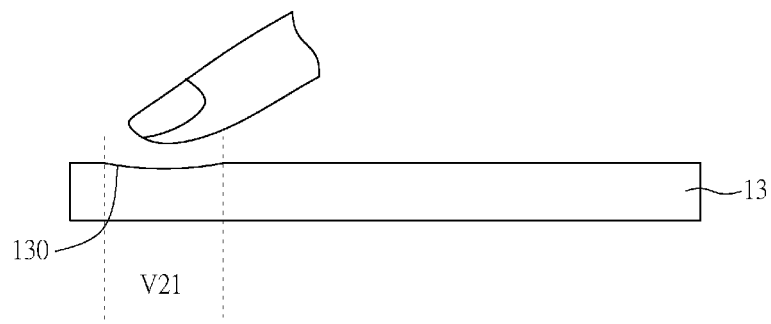
FIG. 3B is a schematic diagram showing the second substrate of the touch panel with fingerprint identification according to some embodiments of the disclosure.

Referring to FIG. 3B, FIG. 3B is a schematic diagram showing the second substrate 13 of the touch panel 100 with fingerprint identification according to some embodiments of the disclosure. FIG. 3B shows the fingerprint identifying area V21 in accordance with various embodiments. The second substrate 13 has a caved-in structure in the upper surface (the surface for user touch operation) oriented toward the lower surface (the surface opposite the upper surface) at the fingerprint identifying area V21 to form a concave portion 130. The normal projections of the concave portion 130 and the fingerprint identification module 12 onto the second substrate 13 overlap each other. The user can press the concave portion 130 to generate a fingerprint signal.

Referring to FIG. 2 again, the first substrate 11 is formed of transparent glass or plastic, and a through hole 110 for housing the fingerprint identification module 12 is formed therein. The first substrate 11 is attached to the lower surface of the second substrate 13 by the first adhesive layer 14. In some embodiments, the attaching manner of the first substrate 11 and the second substrate 13 is full lamination. Specifically, the first adhesive layer 14 is disposed between the first substrate 11 and the second substrate 13, and the space therebetween is fully filled by the first adhesive layer 14. In other embodiments, the attaching manner of the first substrate 11 and the second substrate 13 is edge lamination. Specifically, the first adhesive layer 14 is disposed between the first substrate 11 and the second substrate 13, but is only located at the surroundings of the attached area of the first substrate 11 and the second substrate 13.

The fingerprint identification module 12 is disposed in the through hole 110 of the first substrate 11, and attached to the lower surface of the second substrate 13 by the second adhesive layer 15. The second adhesive layer 15 is disposed between the fingerprint identification module 12 and the second substrate 13. It is noted that in some embodiments, the fingerprint identification module 12 is fixed in the through hole 110 of the first substrate 11 beforehand, and then attached to the second substrate 13.

In some embodiments, glue 18 is filled between the inner sidewall of the through hole 110 of the first substrate 11 and the fingerprint identification module 12 so that the fingerprint identification module 12 is fixed on the first substrate 11. It will be understood that, in some embodiments, the fingerprint identification module 12 is fixed to the first substrate 11 by other methods. For example, the fingerprint identification module 12 is fixed by auxiliary elements, or is engaged to the first substrate 11 by suitable dimensions or shape of the through hole 110. In addition, because the detailed structure of the fingerprint identification module 12 is well known to persons skilled in the art, it is not described here for conciseness.

Figure 4:
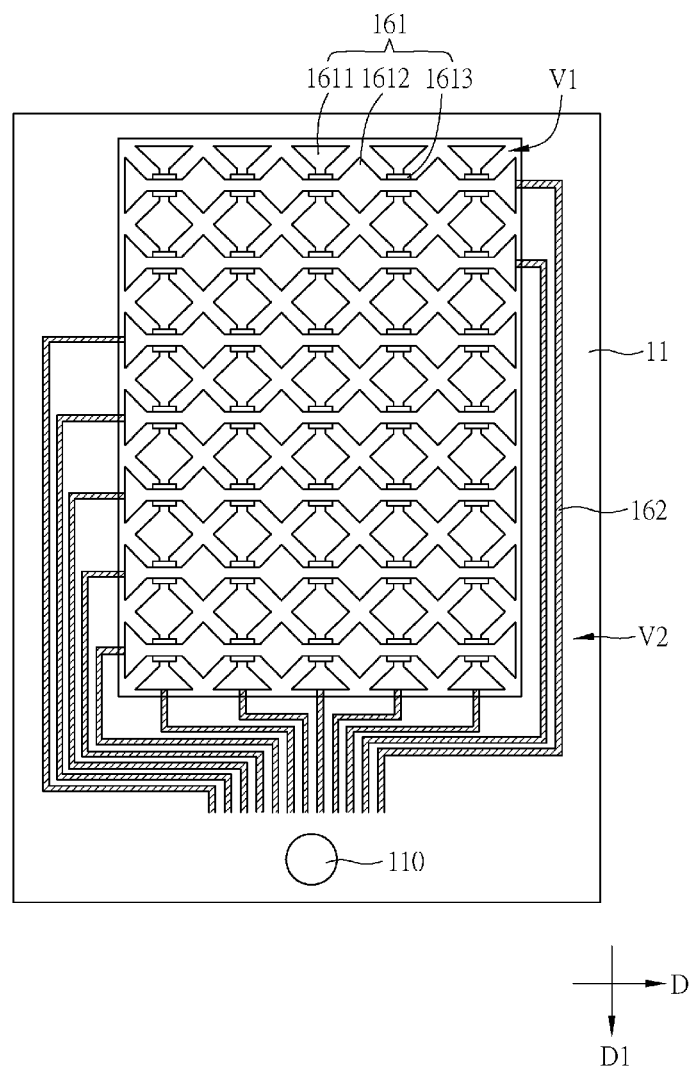
FIG. 4 is a schematic diagram showing the touch sensing structure of the touch panel with fingerprint identification according to some embodiments of the disclosure.

Referring to FIG. 4, FIG. 4 is a schematic diagram showing the touch sensing structure of the touch panel 100 with fingerprint identification according to some embodiments of the disclosure. A touch sensing structure 16 (shown in FIG. 2) is disposed on the lower surface of the first substrate 11, namely the surface of the first substrate 11 further from the second substrate 13. The touch sensing structure 16 includes an electrode layer 161 at the visible area V1, and a conducting wire layer 162 at the invisible area V2. The electrode layer 161 and the conducting wire layer 162 electrically connect to each other. The electrode layer 161 includes a plurality of first axial electrodes 1611, a plurality of second axial electrodes 1612 and an insulating layer 1613. The first axial electrodes 1611 extend along a first direction D1 and are separately arranged in order along a second direction D2. The second axial electrodes 1612 extend along the second direction D2 and are separately arranged in order along the first direction D1. The insulating layer 1613 is formed into insulation blocks at intersections of the first axial electrodes 1611 and the second axial electrodes 1612 to electrically isolate the first axial electrodes 1611 from the second axial electrodes 1612. The first axial electrodes 1611 and the second axial electrodes 1612 respectively and electrically connect to the conducting wire layer 162. The first axial electrodes 1611 and the second axial electrodes 1612 are transparent conductive structures, and materials thereof include one or more than one of ITO, silver nanoparticles, graphene, carbon nanotubes, metal mesh, and other conductive materials, etc. The insulating layer 1613 is a transparent insulating structure made of material such as $SiO_2$, transparent photoresist, etc. The conducting wire layer 162 is formed of metal material, and it is disposed at the invisible area V2 under the covering layer 17 (shown in FIG. 2). The conducting wire layer 162 is hidden by the covering layer 17 and it not visible to the user. In some embodiments, the touch sensing structure 16 is a sensing structure employing a single layer of conductive material. In other embodiments, the touch sensing structure 16 is a sensing structure formed by stacking two or more layers of conductive material. However, the disclosure is not limited thereto.

Referring to FIG. 2 again, the touch panel 100 with fingerprint identification further includes a shielding structure 19 disposed between the first substrate 11 and the second substrate 13, and surrounding the fingerprint identification module 12. The shielding structure 19 provides electromagnetic noise suppression for the fingerprint identification module 12. In some embodiments, the shielding structure 19 is a ring metal structure, and it is disposed on the surface of the first substrate 11 and between the first substrate 11 and the first adhesive layer 14. To be noted, in other embodiments referring to FIG. 5A and FIG. 5B, the shielding structure 19 is disposed between the second substrate 13 and the first adhesive layer 14 (shown in FIG. 2).

Figure 5A:
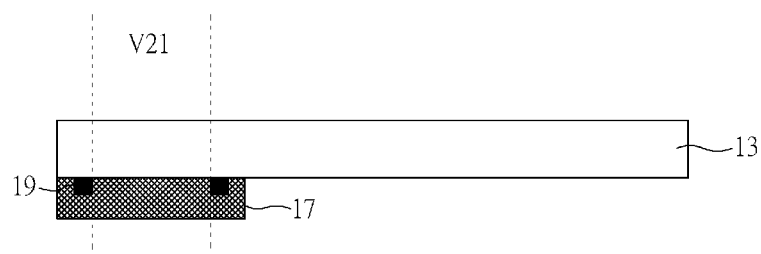
FIG. 5A is a schematic diagram showing a partial structure of the touch panel with fingerprint identification according to some embodiments of the disclosure.

Referring to FIG. 5A, FIG. 5A is a schematic diagram showing a partial structure of the touch panel with fingerprint identification according to some embodiments of the disclosure. The shielding structure 19 is disposed on the lower surface of the second substrate 13 and between the second substrate 13 and the covering layer 17. Because the shielding structure 19 is formed of metal material, its color is distinct from that of covering layer 17. The user may see the shielding structure 19 in front of the touch operation side if it is disposed between the second substrate 13 and the covering layer 17. It can indicate the fingerprint identifying area V21 when surrounding the fingerprint identifying area V21, and thus other indicating elements is omitted.

Figure 5B:
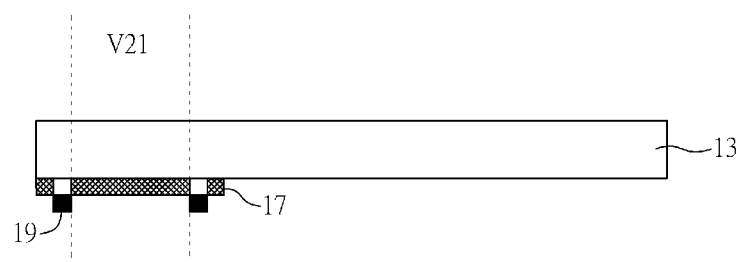
FIG. 5B is a schematic diagram showing a partial structure of the touch panel with fingerprint identification according to some embodiments of the disclosure.

Referring to FIG. 5B, FIG. 5B is a schematic diagram showing a partial structure of the touch panel with fingerprint identification according to some embodiments of the disclosure. The shielding structure 19 is disposed between the covering layer 17 and the first adhesive layer 14, and is correspondingly disposed in the hollowed space of the covering layer 17 shown in FIG. 3A. Due to color difference from the covering layer 17, the user can see the shielding structure 19 from the hollowed space of the covering layer 17. Therefore, indication of the fingerprint identifying area V21 is also implemented, and the step of filling with other shading material shown in FIG. 3A is omitted. To be noted, the shielding structure 19 is a metal element independently formed. It is disposed under the hollowed space of the covering layer 17, and user can see the shielding structure 19 from the hollowed space of the covering layer 17. In other words, the hollowed space of the covering layer 17 is empty. In other embodiments, the shielding structure 19 is formed on the surface of the covering layer 17 by sputtering or printing. Thus, the hollowed space of the covering layer 17 is filled with material of the shielding structure 19. From the finished structure, the shielding structure 19 is partially or wholly embedded in the covering layer 17.

Referring to FIG. 2 again, the first adhesive layer 14, the second adhesive layer 15 and glue 18 mentioned above each has material characteristics. The first adhesive layer 14 is formed of transparent optical adhesive, and it can be solid film or liquid glue. The second adhesive layer 15 is formed of explosion-proof optical adhesive, and it causes less signal suppression than general optical adhesive does. If it is disposed between the second substrate 13 and the fingerprint identification module 12, electrical signal attenuation from the upper surface of the second substrate 13 to the fingerprint identification module 12 is reduced, and sensitivity of the fingerprint identification module 12 is influenced less. The glue 18 is liquid and fluid, and the space between the sidewall of the through hole 110 of the first substrate 11 and the fingerprint identification module 12 is flexibly filled with the glue 18.

Because the touch panel with fingerprint identification is formed by embedding the fingerprint identification module 12 into the first substrate 11 and then attaching it to the whole second substrate 13, it is not necessary to punch a hole on the second substrate 13 so that it does not make an impact on the strength of the second substrate 13 and ensures the performance of the product. In addition, the disposition of the fingerprint identification module 12 is not restricted from activity key. Thus, complicated packaging structure for the activity key is omitted, and the fingerprint identification module 12 is flexibly disposed on the touch panel. Under the premise that fingerprint identification is still ensured, the product structure is simplified and flexibility of product designation is improved.

Figure 6:
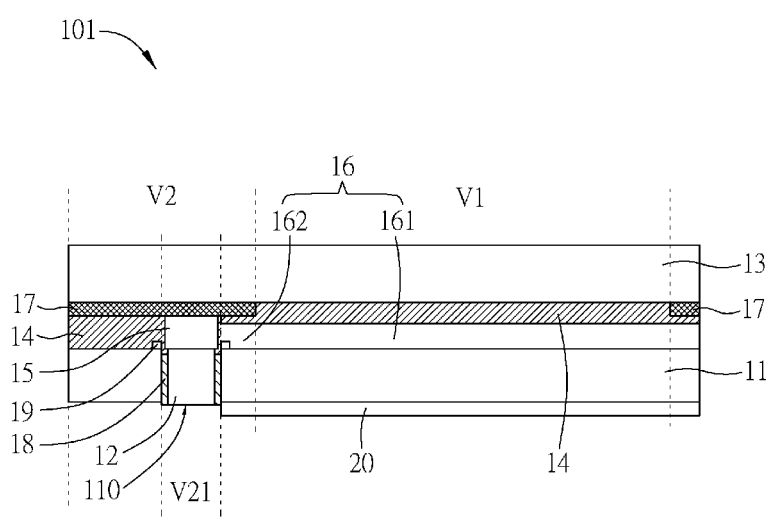
FIG. 6 is a sectional-drawing along cross-section line AA' in FIG. 1.

In the above embodiments, the touch sensing structure 16 is disposed on the lower surface of the first substrate 11. In other embodiments, the touch sensing structure 16 is disposed at other positions. Referring to FIG. 1 and FIG. 6, FIG. 6 is a sectional drawing along cross-section line AA' in FIG. 1, and it shows the touch panel with fingerprint identification according to some embodiments of the disclosure.

The difference between this configuration and the above configurations is that the touch sensing structure 16 is disposed on the upper surface of the first substrate 11, namely, disposed on the surface of the first substrate 11 closer to the second substrate 13 and between the first substrate 11 and the first adhesive layer 14. In addition, the touch panel 101 with fingerprint identification in this configuration further includes a conductive material layer 20 which is disposed on the lower surface of the first substrate 11 and provides electromagnetic noise suppression for the touch sensing structure 16. The conductive material layer 20 is formed of transparent conductive material. It is a structure of entire surface or only disposed on the surroundings of the lower surface of the first substrate 11 to form a ring structure. However, the disclosure is not limited thereto. Since the relationships between other elements of the touch panel 101 with fingerprint identification in this configuration are similar to those of the above description, they are not described here for conciseness.

Figure 7:
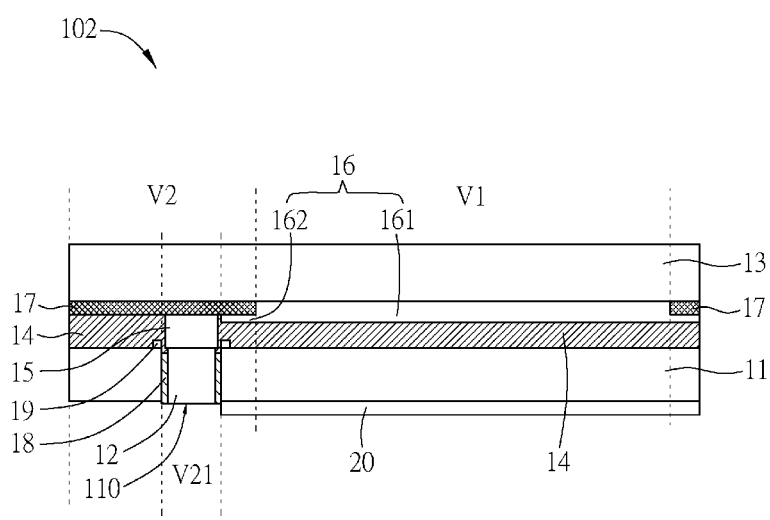
FIG. 7 is a sectional-drawing along cross-section line AA' in FIG. 1.

Referring to FIG. 1 and FIG. 7, FIG. 7 is a sectional-drawing along cross-section line AA' in FIG. 1 showing the touch panel with fingerprint identification according to some embodiments of the disclosure. The difference between this configuration and the configurations described above is that the touch sensing structure 16 is disposed on the lower surface of the second substrate 13, namely, disposed on the surface of the second substrate 13 to closer the first substrate 11, and the covering layer 17 is between the second substrate 13 and the touch sensing structure 16. In the touch panel 102 with fingerprint identification in this embodiment, the touch sensing structure 16 is directly disposed on the surface of the second substrate 13, the fingerprint identification module is disposed in the through hole 110 of the first substrate 11, and both of them are then attached to each other. This avoids interaction of manufacturing processes for forming the touch sensing structure 16 on the first substrate 11 and further fixing the fingerprint identification module 12 therewith. The manufacturing difficulty regarding the first substrate 11 is lightened, and process yield is improved to a certain degree. Furthermore, because the touch sensing structure 16 is disposed on the lower surface of the second substrate 13, the touch sensing structure 16 is also closer to the user operation side. Therefore, the touch signal from the user is enhanced, and sensitivity of the touch sensing structure 16 is improved. Since the relationships between other elements of the touch panel 102 with fingerprint identification in this configuration are similar to those of the previous embodiments, they are not described herein for conciseness.

To be noted, in the above embodiments, the touch sensing structure 16 is directly formed on the surface of the first substrate 11 or the second substrate 13. In other embodiments, the touch sensing structure 16 is formed on a thin film beforehand, and then the thin film is attached to the surface of the first substrate 11 or the second substrate 13. However, the disclosure is not limited thereto.

In summary, because the touch panel with fingerprint identification is formed by disposing the fingerprint identification module in the through hole of the first substrate and then attaching it to the second substrate, it is not necessary to punch a hole on the second substrate which is used for protecting product (i.e. the cover plate of the product). Therefore, the integrity of the second substrate is ensured, the strength of the substrate is kept, and the performance of the product is also ensured.

Although the present disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present disclosure.

What is claimed is:

1. A touch panel with fingerprint identification, comprising:
    a fingerprint identification module disposed in a through hole of a first substrate;
    a glue between the fingerprint identification module and a sidewall of the first substrate defining the through hole to fix the fingerprint identification module to the first substrate;
    a first adhesive layer disposed between the first substrate and a second substrate to attach the first substrate to the second substrate, wherein the first adhesive layer is different than the glue;
    a second adhesive layer disposed between the fingerprint identification module and the second substrate to attach the fingerprint identification module to the second substrate, wherein the second adhesive layer is different than the first adhesive layer and the glue;
    a covering layer disposed between the first adhesive layer and the second substrate;
    a touch sensing structure disposed between and contacting the first adhesive layer and the first substrate; and
    a conductive material layer disposed on a second side of the first substrate that is opposite a first side of the first substrate that contacts the first adhesive layer,
        wherein the covering layer covers the glue, the second adhesive layer, the fingerprint identification module, the first adhesive layer, and the conductive material layer.

2. The touch panel with fingerprint identification of claim 1, wherein, the first adhesive layer comprises a transparent optical adhesive.

3. The touch panel with fingerprint identification of claim 1, wherein the second substrate comprises glass.

4. The touch panel with fingerprint identification of claim 1, further comprising:
    a shielding structure surrounding the fingerprint identification module and disposed between the first substrate and the second substrate.

5. The touch panel with fingerprint identification of claim 1, wherein the second substrate has a thickness of less than or equal to about 0.3 mm.

6. The touch panel with fingerprint identification of claim 1, further comprising:
    a pattern structure for indicating a fingerprint identifying area.

7. The touch panel with fingerprint identification of claim 1, wherein the covering layer comprises printed ink.

8. The touch panel with fingerprint identification of claim 1, wherein the touch sensing structure comprises an electrode layer and a conducting wire layer.

9. The touch panel with fingerprint identification of claim 1, wherein the second substrate has a concave portion over the fingerprint identification module.

10. A touch panel with fingerprint identification, comprising:
    a fingerprint identification module disposed in a through hole of a first substrate;
    a glue between the fingerprint identification module and a sidewall of the first substrate defining the through hole to fix the fingerprint identification module to the first substrate;
    a first adhesive layer disposed between the first substrate and a second substrate to attach the first substrate to the second substrate, wherein the first adhesive layer is different than the glue;
    a second adhesive layer disposed between the fingerprint identification module and the second substrate to attach the fingerprint identification module to the second substrate, wherein the second adhesive layer is different than the first adhesive layer and the glue;
    a covering layer disposed between the first adhesive layer and the second substrate;
    a touch sensing structure disposed between and contacting the first adhesive layer and the second substrate; and
    a conductive material layer disposed on a second side of the first substrate that is opposite a first side of the first substrate that contacts the first adhesive layer,
        wherein the covering layer covers the glue, the second adhesive layer, the fingerprint identification module, the first adhesive layer, and the conductive material layer.

11. The touch panel with fingerprint identification of claim 10, wherein, the first adhesive layer comprises a transparent optical adhesive.

12. The touch panel with fingerprint identification of claim 10, wherein the second substrate comprises glass.

13. The touch panel with fingerprint identification of claim 10, further comprising:
a shielding structure surrounding the fingerprint identification module and disposed between the first substrate and the second substrate.

14. The touch panel with fingerprint identification of claim 10, wherein the second substrate has a thickness of less than or equal to about 0.3 mm.

15. The touch panel with fingerprint identification of claim 10, further comprising:
a pattern structure for indicating a fingerprint identifying area.

16. The touch panel with fingerprint identification of claim 10, wherein the covering layer comprises printed ink.

17. The touch panel with fingerprint identification of claim 10, wherein the touch sensing structure comprises an electrode layer and a conducting wire layer.

18. The touch panel with fingerprint identification of claim 10, wherein the second substrate has a concave portion over the fingerprint identification module.

19. A touch panel with fingerprint identification, comprising:
a fingerprint identification module disposed in a through hole of a first substrate;
a glue between the fingerprint identification module and a sidewall of the first substrate defining the through hole to fix the fingerprint identification module to the first substrate;
a first adhesive layer disposed between the first substrate and a second substrate to attach the first substrate to the second substrate, wherein the first adhesive layer is different than the glue and is in direct contact with the first substrate;
a covering layer disposed between the first adhesive layer and the second substrate;
a second adhesive layer disposed between the fingerprint identification module and the covering layer to attach the fingerprint identification module to the second substrate, wherein the second adhesive layer is different than the first adhesive layer and the glue; and
a touch sensing structure disposed on the first substrate opposite the first adhesive layer,
wherein the covering layer covers the glue, the second adhesive layer, the fingerprint identification module, the touch sensing structure, and the first adhesive layer.

20. The touch panel with fingerprint identification of claim 19, further comprising:
a pattern structure for indicating a fingerprint identifying area.

* * * * *